United States Patent
Mendoza et al.

(10) Patent No.: US 10,148,512 B2
(45) Date of Patent: Dec. 4, 2018

(54) MOBILE VIDEO OPTIMIZATION

(71) Applicant: T-Mobile USA, Inc., Bellevue, WA (US)

(72) Inventors: Salvador Mendoza, Issaquah, WA (US); Jeffery Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 167 days.

(21) Appl. No.: 15/235,260

(22) Filed: Aug. 12, 2016

(65) Prior Publication Data

US 2018/0048524 A1 Feb. 15, 2018

(51) Int. Cl.
| | |
|---|---|
| H04L 12/24 | (2006.01) |
| H04L 29/06 | (2006.01) |
| H04L 29/08 | (2006.01) |
| H04W 4/24 | (2018.01) |
| H04L 12/70 | (2013.01) |
| H04L 12/14 | (2006.01) |
| H04M 15/00 | (2006.01) |

(52) U.S. Cl.
CPC .......... *H04L 41/0896* (2013.01); *H04L 12/14* (2013.01); *H04L 12/1407* (2013.01); *H04L 47/00* (2013.01); *H04L 65/00* (2013.01); *H04L 67/02* (2013.01); *H04L 67/2857* (2013.01); *H04L 69/22* (2013.01); *H04M 15/66* (2013.01); *H04W 4/24* (2013.01)

(58) Field of Classification Search
CPC . H04L 41/0896; H04L 67/02; H04L 67/2857; H04L 69/22; H04W 4/24; H04N 21/2401; H04N 21/632; H04N 21/44004
See application file for complete search history.

(56) References Cited

U.S. PATENT DOCUMENTS

| | | | | |
|---|---|---|---|---|
| 7,366,133 | B1 * | 4/2008 | Majidi-Ahy | H04L 1/0003 370/329 |
| 8,630,396 | B2 * | 1/2014 | Herriman | H04M 11/066 379/100.08 |
| 9,331,983 | B2 | 5/2016 | Zhou et al. | |
| 2007/0192812 | A1 | 8/2007 | Pickens et al. | |
| 2012/0236720 | A1 | 9/2012 | Romero et al. | |
| 2014/0082146 | A1 | 3/2014 | Bao et al. | |
| 2014/0139687 | A1 * | 5/2014 | Adams | H04N 17/004 348/192 |

(Continued)

OTHER PUBLICATIONS

International Search Report & Written Opinion dated Dec. 7, 2017 in PCT Application No. PCT/US2017/046497, 15 pages.

*Primary Examiner* — Ahmed Elallam
(74) *Attorney, Agent, or Firm* — Han Santos, PLLC (57) ABSTRACT

A system and method of optimizing video content is provided. A request for data is received by an Application Delivery Controller from a user device (UD). Upon determining that the request for data is related to video content, an operating mode message is sent to an element of the packet core network to configure the element of the packet core network to provide the video content by transmitting a predetermined volume of data of the video content in burst mode to a memory buffer of the UD. Upon completion of the burst mode, a continuation of a data related to the video content is transmitted at a trickle mode that is slower than the burst mode. The cycle continues between burst mode and trickle mode for every trigger event.

17 Claims, 5 Drawing Sheets

(56) References Cited

U.S. PATENT DOCUMENTS

| | | | |
|---|---|---|---|
| 2014/0250229 A1* | 9/2014 | Prokopenko | H04L 47/788 709/226 |
| 2014/0281009 A1* | 9/2014 | Moorthy | G06F 17/30017 709/231 |
| 2015/0032899 A1 | 1/2015 | Willars et al. | |
| 2016/0094614 A1* | 3/2016 | Ulupinar | H04L 65/4084 709/219 |
| 2016/0156942 A1* | 6/2016 | Bao | H04L 65/605 725/116 |
| 2016/0191258 A1* | 6/2016 | Oyman | H04L 12/189 370/312 |
| 2016/0192296 A1* | 6/2016 | Rehan | H04L 65/604 455/574 |
| 2016/0269801 A1* | 9/2016 | Harden | H04N 21/6373 |
| 2016/0366202 A1* | 12/2016 | Phillips | H04L 43/08 |
| 2017/0006081 A1* | 1/2017 | Grandl | H04L 67/26 |
| 2017/0366950 A1* | 12/2017 | Arbon | H04W 4/18 |
| 2018/0034766 A1* | 2/2018 | Chiba | H04L 61/1511 |

* cited by examiner

MOBILE VIDEO OPTIMIZATION

BACKGROUND

In recent years, mobile wireless communications have become increasingly popular. Mobile devices are used to make voice calls, check email and text messages, update social media pages, stream media, browse websites, and so forth. In at least one estimate, mobile data traffic has grown 4,000 fold over the past 10 years. As a result, users expect their mobile devices to provide many functions, including reliably working on a mobile communication network to receive constant and dependable telecommunication and data communication services. The rapid proliferation of wireless networks and mobile computing applications has put additional demands on mobile communication networks.

Today, video usage is about 60% of data traffic for many mobile network carriers and is projected to increase steadily. In some projections, video usage could increase to 72% by the end of 2018. Furthermore, the resolution of available video content has steadily increased from standard definition (i.e., 480p), to high definition (HD) ready (i.e., 720p), Full HD (i.e., 1080p), and Ultra High Definition (UHD) (i.e., 4K). The ever increasing demand for video content is using valuable mobile communication network resources and may be depleting the data allotment for account holders.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to digital data transmission and more particularly to techniques for optimizing the transmission of video content over a wireless network. A request for data is received by an Application Delivery Controller from a user device (UD). Upon determining that the request for data is related to video content, an operating mode message is sent to an element of the packet core network to configure the element of the packet core network to provide the video content by transmitting a predetermined volume of data of the video content in burst mode to a memory buffer of the UD. Upon completion of the burst mode, a continuation of a data related to the video content is transmitted at a trickle mode that is slower than the burst mode. The cycle continues between burst mode and trickle mode for every trigger event. By virtue of the concepts discussed herein a user of the UD is able to enjoy video content at a resolution that is optimized for preventing packet core network congestion, thereby preventing buffering delays and conserving valuable radio access network resources. The techniques described herein may be implemented in a number of ways. Example implementations are provided below with reference to the following figures.

Example Network Architecture

Figure 1:
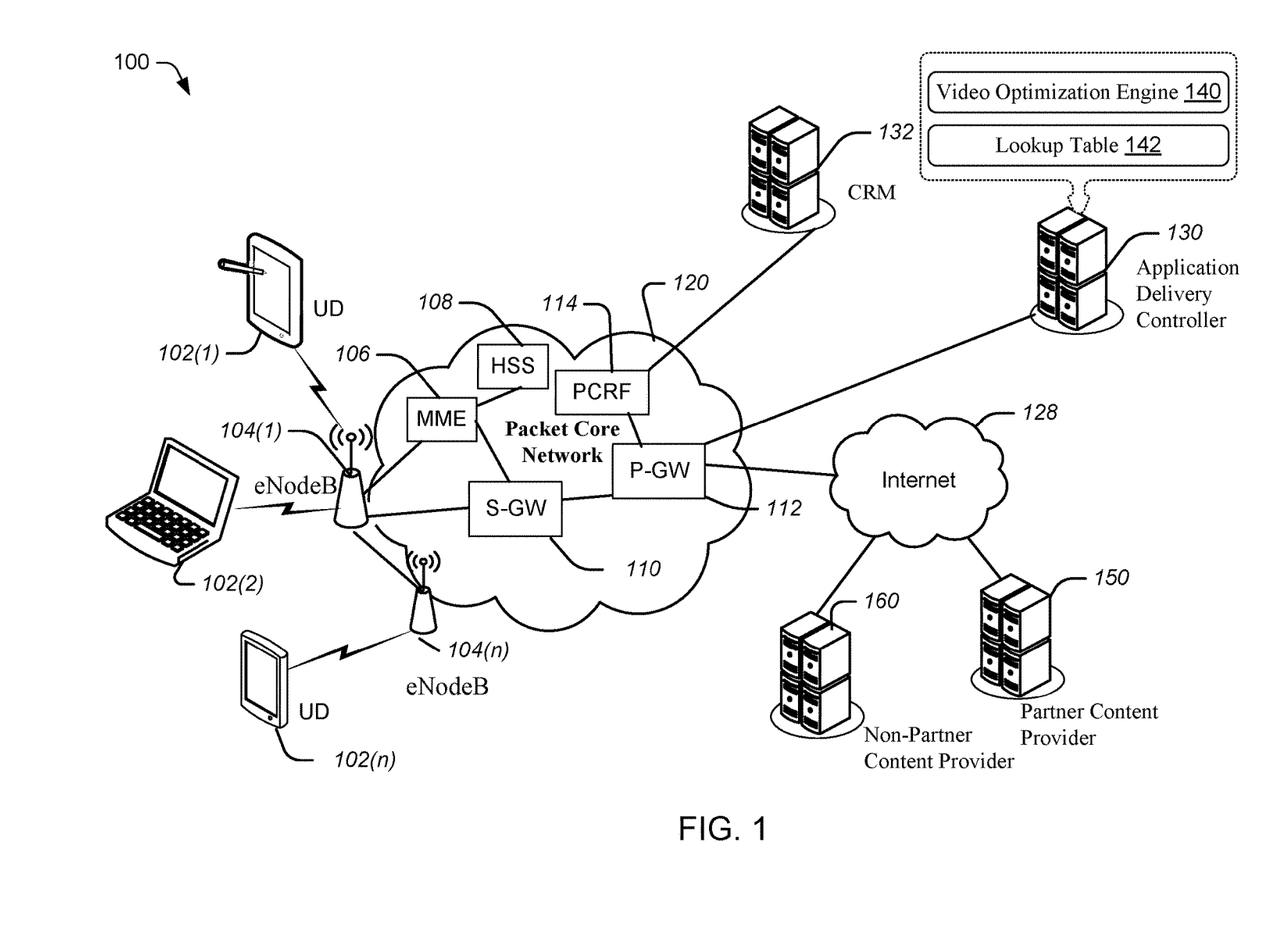
FIG. 1 illustrates an example architecture for implementing a video optimization system.

FIG. 1 illustrates an example architecture for implementing a video optimization system. FIG. 1 illustrates a mobile communication network 100 as may be operated by a mobile communication network carrier or service provider to provide a wide range of mobile communication services and ancillary services or features to its subscriber customers and associated mobile device users. Many of the elements generally indicated by the reference numeral 100 are elements of the mobile communication network and are operated by or on behalf of the carrier. The mobile communication network 100 provides communications between various user devices (UD's), such as UD's 102(1) to 102(n), as well as communications for the UDs with networks and stations outside the mobile communication network 100.

For purposes of later discussion, several UD's appear in the drawing, to represent some examples of the devices that may receive various services via the packet core network 120. Today, UD's typically take the form of portable handsets, smart-phones, tablet computers, personal digital assistants (PDAs), and smart watches, although they may be implemented in other form factors, including consumer, and business electronic devices.

The mobile communication network 100 provides communication for UD's 102(1) to 102(n), as well as for mobile devices that do not participate in the video optimization system described herein. Mobile communication network 100 allows users of the UD's (e.g., customers or subscribers to the packet core network 120) to initiate communication, and receive information from the internet 128.

The mobile communication network 100 typically is implemented by a number of interconnected networks. Hence, the overall mobile communication network 100 may include a number of Radio Access Networks (RANs), represented by eNodeB 104(1) to 104(n), as well as regional ground networks interconnecting a number of RANs and a wide area network (WAN) interconnecting the regional ground networks to core network elements, such as the Multimedia Messaging Service Centers (MMSCs). A regional portion of the mobile communication network 100, such as that serving UD's 102(1) to 102(n) may include one or more RANs (represented by the packet core network 120) and a regional circuit and/or packet switched network and associated signaling network facilities.

Physical elements of a packet core network 120, operated by one of the mobile service providers or carriers, include a number of base stations, represented in the example of FIG. 1 by eNodeB 104(1) and 104(n) nodes. Such eNodeB 104(1) to 104(n) nodes may include a base transceiver system (BTS) that communicates via an antennae system at the site of the node and over the air-link with one or more of the UD's (102(1) to 102(n)) when the UD's are within range.

Each eNodeB 104 node may include a BTS coupled to several antennae mounted on a radio tower within a coverage area often referred to as a "cell." The BTS is the part of the radio network that sends and receives RF signals to/from the UD's that the eNodeB node 104 currently serves.

The packet core network 120 carries the user communications for the UD's between the respective eNodeB 104 nodes and other elements with or through which the UD's communicate. Some individual elements such as switches and/or routers forming the packet core network 120 are omitted here for simplicity. It will be understood that the various network elements can communicate with each other, as well as other elements of the packet core network 120, and other networks (e.g., the public switched telephone network (not shown) and the Internet 128 either directly or indirectly.

By way of illustrative example only and not limitation, the packet core network 120 includes elements of the Evolved Packet Core (EPC) and the Evolved Universal Mobile Telecommunications System (UMTS) Terrestrial Access Network (E-UTRAN) and the access network E-UTRAN. For simplicity, classical UMTS architecture elements, such as the UTRAN, are not displayed.

The Mobility Management Entity (MME) 106 is the control node that processes the signaling between the user devices 102(1) to 102(n) and the packet core network 120. The Home Subscriber Server (HSS) 108 includes the UD users' subscription data, such as the Evolved Packet System (EPS) subscribed quality of service (QOS) profile and access restrictions for roaming.

The serving gateway (S-GW) serves as the local mobility anchor for data bearers when a UD moves between eNodeB's (e.g., from eNodeB 104(1) to 104(n)). It also retains the information about the bearers when the UE is in the idle state and may temporarily buffer downlink data while the MME 106 initiates paging of the UD to reestablish the bearers. In addition, the S-GW performs some administrative functions in the packet core network 120 such as collecting information for charging against an account of a UD. For example, the volume of data sent to or received from various content providers, such as partner and non-partner content providers 150 and 160 may be calculated. It also may serve as the mobility anchor for interworking with other 3GPP technologies such as general packet radio service (GPRS) and UMTS.

The Packet Data Network Gateway (P-GW) 112 is responsible for IP address allocation for the UD, as well as QoS enforcement and flow-based charging according to rules from the policy charging rules function (PCRF) 114. It may filter the downlink user IP packets into the different QoS-based bearers. This is performed based on Traffic Flow Templates (TFTs). The P-GW performs QoS enforcement for guaranteed data rate (GBR) bearers. For example, the P-GW 112 may receive instructions from an Application Delivery Controller 130 regarding when to enter burst mode and when to throttle data related to video content that is received from partner 150 and non-partner 160 content providers. An Application Delivery Controller may be a server or part of servers that assist in load balancing traffic for web farms. In one embodiment, the Application Delivery Controller is a logical function that resides within the P-GW 112.

It should be noted that while a single gateway 112 is illustrated in FIG. 1 in the form of a P-GW for simplicity, different types of gateway servers may be used for different wireless technologies. For example, a high availability (HA) server can be used for 3G; a P-GW server for 4G; general packet radio service core network (GGSN) for 2G, 3G, and wideband code division multiple access (WCDMA); etc. The different types of gateway servers are sometimes collectively referred to herein as gateway server 112.

The Policy Control and Charging Rules Function (PCRF) 114 is responsible for policy control decision-making, as well as for controlling the flow-based charging functionalities in the Policy Control Enforcement Function (PCEF), which is in the P-GW 112. For example, the PCRF 114 provides the QoS authorization (QoS class identifier [QCI] and data rates) that decides how a data flow related to video content is to be handled in the PCEF such that this is in accordance with the user's subscription profile.

The service provider of the packet core network 120 may also operate a number of systems that provide ancillary functions in support of the communications services and/or application services provided through the packet core network 120, and those elements communicate with other nodes or elements of the packet core network 120, such as one or more private IP type packet data networks based on a packet data communication network (PDCN), sometimes referred to as an Intranet (i.e., a private network).

In the example of FIG. 1, there is an Application Delivery Controller 130 that is configured to communicate with the UD's 102(1) to 102(n) via the P-GW 112 of the packet core network 120. The Application Delivery Controller 130 can also communicate over the Internet 128. In one embodiment, the Application Delivery Controller 130 has a video optimization engine (e.g., a software program) stored in its memory to perform various functions, including determining whether a request for data from a UD is related to video content, determining whether the request is to a partner 150 or a non-partner content provider 130, sending instructions to the P-GW 112 such that video content is streamed at standard (SD) resolution, etc.

In one embodiment, there is a customer relationship management (CRM) server 130 coupled to the PCRF 114 of the packet core network 120 that offers its account holders (e.g., a user of a UD) on-line access to a variety of functions related to the account holders' account, such as on-line payment information, subscription changes, password control, and the like. The CRM server 130 may provide the user an interface via the Internet 128 to access the account information. Hence, a user's terminal, such as PC, may be used to access on-line information about a UD's user's account, which the packet core network carrier makes available via the carrier's web site, accessible through the Internet 128.

The mobile communication network 100 provides it's subscribed UD's 102(1) to 102(n) access to various content providers. In some scenarios, the data requested may be related to video content. Such video content may be provided from partner content providers 150 or non-partner content providers 160. A partner content provider may be a multimedia provider that has an agreement with the mobile network carrier of the packet core network 120, whereas a non-partner content provider may without an agreement. For example, partner content providers may include Amazon Video®, HBO NOW®, Hulu®, Netflix®, SlingTV®, YouTube®, etc. The partner content providers 150 may change over time and may be tracked via a lookup table 142 in the Application Delivery Controller 130.

In one embodiment, content that is routed from a partner content provider 150 to a UD is charged against an account holder of a UD at a different rate than content that is provided from a non-partner content provider 160. For example, data related to video content from a partner content provider 150 may not be charged (e.g., against a monthly data usage allotment) whereas video content from a non-partner content provider 160 may be charged.

While the Application Delivery Controller 130 and the CRM server 132 are illustrated by way of example as separate servers, they may be implemented on different hardware platform combinations. Thus, the functionality described herein with respect to each of the servers 130 and 132 can also be provided by one or multiple different computing devices. In other words, the Application Delivery Controller 130 and the CRM 132 need not be a stand-alone computing devices but can be combined in various configurations. In one embodiment, the Application Delivery Controller 130 and/or the CRM server 132 may have a scalable and fault-tolerant architecture, such as that provided by the cloud.

Example User Device Components

Figure 2:
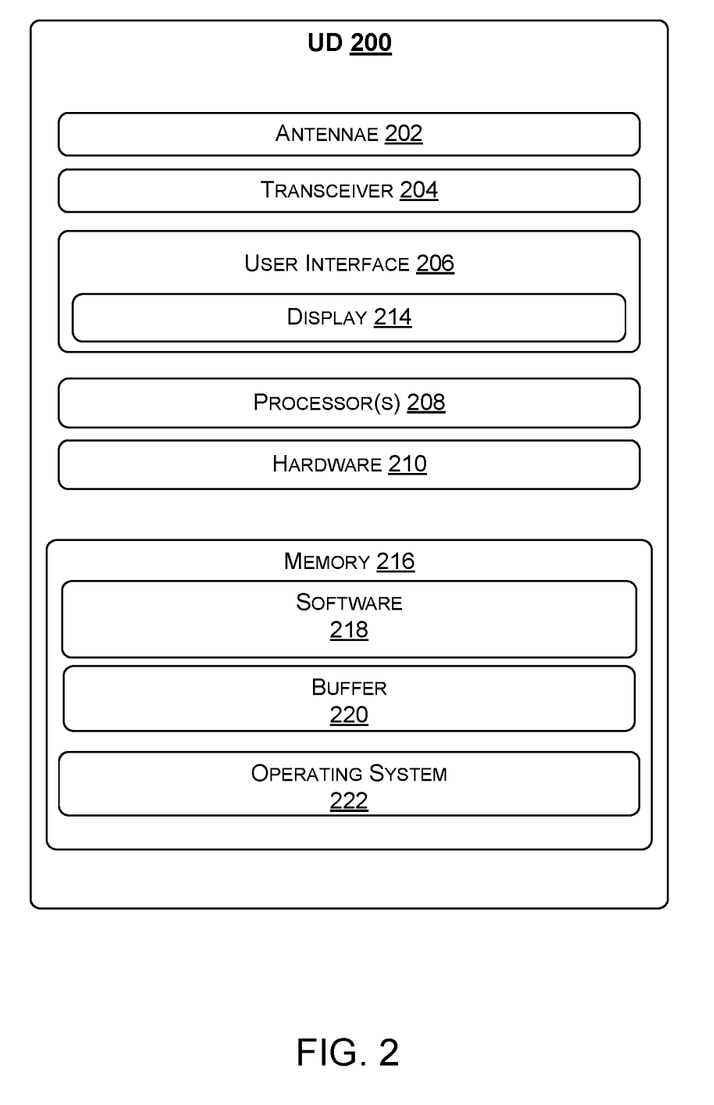
FIG. 2 is a block diagram showing various components of an illustrative user device.

FIG. 2 is a block diagram showing various components of an illustrative user device 200. As discussed in the context of FIG. 1, the optimized transfer of video content discussed herein involves an interaction with appropriately configured user devices. To that end, it may be useful to consider the functional elements/aspects of an exemplary UD, at a high-level. For purposes of such a discussion, FIG. 2 provides a block diagram illustration of an exemplary UD 200. It will be understood that the UD 200 may be a handset type mobile phone or may be incorporated into another device, such as a personal digital assistant (PDA), a tablet computer, or the like. For discussion purposes, the illustration shows the UD 200 in the form of a handheld smart-phone.

The UD 200 may include one or more antennae 202, a cellular transceiver 204, a Wi-Fi transceiver 205, user interface 206, one or more processors 208, hardware 210, and memory 216. In some embodiments, the antennae 202 include an uplink antenna that sends radio signals to a radio tower, sometimes referred to herein as an eNodeB (e.g., 104(1) in FIG. 1), and a downlink antenna that receives radio signals from the radio tower. In other embodiments, a single antenna may both send and receive radio signals. These signals may be processed by the cellular transceiver 204, which is configured to receive and transmit digital data.

The UD 200 may include a user interface 206 that enables a user to provide input and receive output from the UD 200. For example, the user interface 206 may include a data output device (e.g., visual display 214, audio speakers, haptic device, etc.) that may be used to display video content from partner and non-partner content providers 150 and 160. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces that may be used to request data from various sources, including from various content providers over the packet core network 120.

The UD 200 may include one or more processors 208, which may be a single-core processor, a multi-core processor, a complex instruction set computing (CISC) processor, or another type of processor. The hardware may include a power source and digital signal processors (DSPs), which may include single-core or multiple-core processors. The processors may perform operation in parallel to process a stream of data that may be provided over the packet core network 120.

The hardware 210 may also include network processors that manage high speed communication interfaces, including communication interfaces that interact with peripheral components. The network processors and the peripheral components may be linked by switching fabric. The hardware may further include hardware decoders and encoders, a network interface controller, and/or a universal serial bus (USB) controller.

The network interface controller may enable the processors to transmit and receive data via the packet core network 120 of FIG. 1. In some embodiments, the hardware may also include a direct memory access (DMA) engine. The DMA engine may enable the various controllers to access the memory 216 independently of the one or more processors 208 to perform tasks. The various controllers and processors of the UD 200 may execute instructions and perform tasks under the direction of software components that are stored in the memory 216.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components that are executable or accessible by the processor(s) 208 and controller(s) of the UD 200. The various components of the memory 216 may include software 218 and an operating system 222. Each software module may include routines, program instructions, objects, and/or data structures that perform particular tasks or implement particular abstract data types. For example, the software 218 of the memory 216 may include one or more software applications that are configured to receive and play video content at a resolution that is supported by the data rate provided by the packet core network 120. For example, a software application may be used to receive video content from various content providers, such as Hulu® or Netflix®, which may be displayed at a more efficient resolution, such as standard definition (SD) resolution to conserve the packet core network 120 resources and to provide a reliable and uninterrupted video experience.

The memory may include a buffer 220 that is configured to receive data from various content providers via the packet core network 120. For example, the data may relate to video content from a partner or non-partner content provider 150 and 160, which is buffered in the buffer 220. Video content may be streamed from a content provider and received by the buffer 220 of the user device in the form of batches of data. Such data may be received in cycles of burst mode followed by trickle mode in response to trigger events. As used herein, burst mode is when data is provided at a first data rate, which may be a fast data rate. In various embodiments, the burst mode is based on the fastest data rate that the UD 200 and the packet core network 120 can accommodate and/or the account of the UD 200 is subscribed for. Thus, the burst mode may be based on the fastest data rate available.

The burst rate lasts for a length of time to transfer a predetermined volume of data. For example, there may be a 12 Mb limit for burst mode for each data transfer cycle. The volume of data that is provided by the burst mode may be based on preventing the UD 200 from entering a play mode that is above that of standard definition. Thus, the volume of data during the burst mode may be reduced to a level to prevent entering HD, HD ready, Full HD, and/or UHD.

In each data transfer cycle, upon completion of the burst mode, the buffer 220 receives data at a reduced data rate, referred to herein as the trickle mode. The trickle mode is when data related to video content is provided to the buffer 220 at a second data rate, which is substantially slower than the first data rate of the burst mode. For example, the data rate during trickle mode may be 1.5 Mb/sec maximum. Thus, during a cycle, the buffer 220 is initially supplied with data at a first data rate during burst mode, which is followed by a second data rate during the trickle mode. The trickle mode is maintained until a trigger event is reached, as discussed below.

When the volume of data in the buffer 220 is below a predetermined threshold (e.g., 10%), a request is sent from the UD 200 to the packet core network 120 to provide additional data. Such request initiates another cycle of data beginning with a burst mode and followed by a trickle mode. Since the data available in the buffer 220 is below a threshold requirement for more advanced resolution (e.g., HD, HD ready, etc.,) the UD 200 automatically enters a reduced resolution mode (e.g., SD). Accordingly, the user of the UD 200 is able to enjoy video content on the display 214 at a resolution that is optimized for preventing radio access network congestion, thereby preventing buffering delays and conserving valuable radio access network resources.

In one embodiment, the burst mode is different in different scenarios. For example, as the UD 200 is moved from one place to another, then the burst mode data rate may be higher or lower depending on the base stations that the UD 200 is communicating with. Put differently, an adaptive data rate (ABR) may be used during the burst mode, such that the maximum available data rate is used for the predetermined volume of data of the burst mode (e.g., 12 MB). This concept is discussed in more detail later. Thus, the radio access network service provider together with the content providers can offer users of the UD 200 with a superior viewing experience by adjusting the data rate during the burst mode based on the available bandwidth. The user of the UD 200 does not experience delays and enjoys a continuous video experience.

The operating system 222 may include components that enable the UD 200 to receive and transmit data via various interfaces (e.g., user controls, communication interface, and/or memory input/output devices), as well as process data using the processors 204 to generate output. The operating system 222 may include a presentation component that presents the output (e.g., display the data on an electronic display 214 of the UD 200, store the data in memory 216, transmit the data to another electronic device (e.g., via tethering), etc.). Additionally, the operating system 222 may include other components that perform various additional functions generally associated with an operating system.

Example Video Data Transfer

Figure 3:
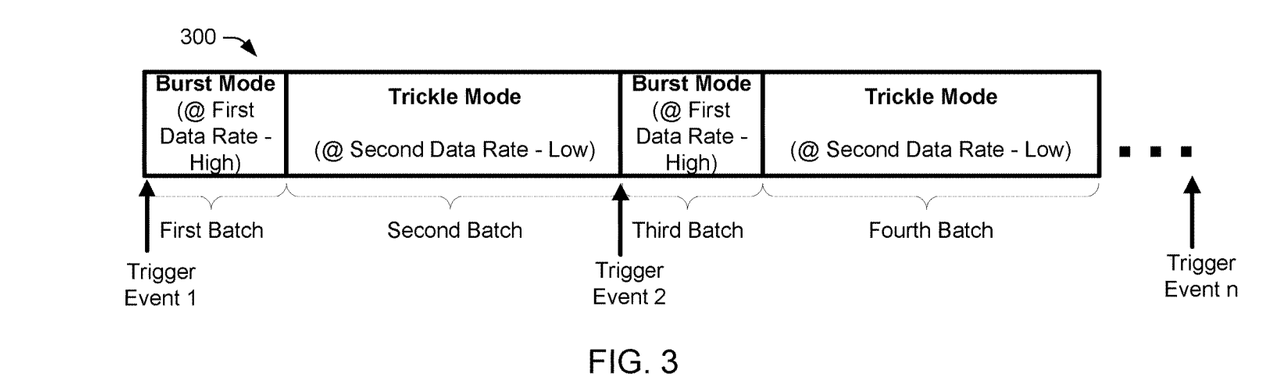
FIG. 3 illustrates a block diagram of an example video data transfer in response to a trigger event.

FIG. 3 illustrates a block diagram of an example video data transfer in response to a trigger event. For example, a UD may request data content from a content provider over the packet core network 120 of FIG. 1. The video optimization engine 140 of the Application Delivery Controller 130 determines that this request is related to video content and should therefore be streamed such that it is played on the requestor UD in lower resolution (e.g., SD instead of HD). To that end, an operating mode message (i.e., an instruction) is sent to the P-GW 112 by the video optimization engine 140 of the Application Delivery Controller 130 such that the streaming of data should be according to the data transfer 300 of FIG. 3.

As illustrated in FIG. 3, video content is provided to the UD in transfer cycles that are initiated by a trigger event. The first trigger event may be a notification or message from the video optimization engine 140 that the request from the UD is related to video content. The first batch of data is sent in burst mode, which is at a high data rate. For example, the data rate during burst mode may be the maximum data rate available in that region at that time of the data transfer and what is allocated for the account of the UD. In one embodiment, the burst mode lasts for the length of time that it takes to transfer a predetermined volume of data (e.g., 12 Mb).

Upon completion of the burst mode, the second batch of data is transferred at a second data rate (i.e., trickle mode), which is slower than the first data rate. The trickle mode continues until the second trigger event occurs, indicating that the buffer of the UD is below a predetermined threshold. Thus, to provide an uninterrupted viewing experience, additional data is requested to replenish the buffer. The second trigger event initiates the second data transfer cycle, which is similar to the first data transfer cycle in that it has a burst mode that transfers the third batch of data that is followed by a trickle mode that transfers the fourth batch of data. The cycle continues in response to additional trigger events.

Figure 4:
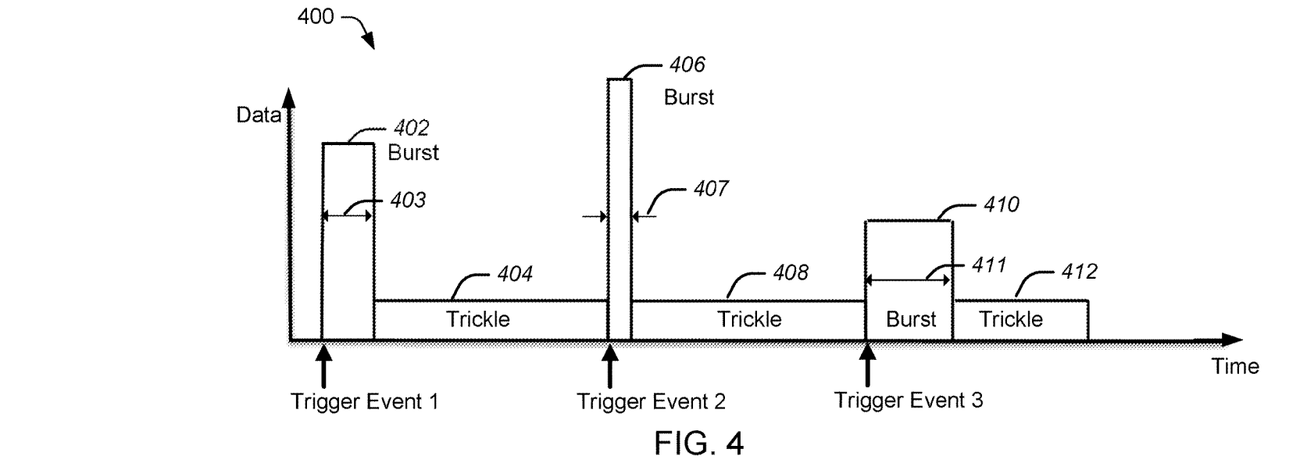
FIG. 4 illustrates a chart for an example video data transfer in response to trigger events at different data rates during burst mode.

FIG. 4 illustrates a chart for an example video data transfer in response to trigger events at different data rates during burst mode. Data flow 400 is in harmony with the data flow 300 of FIG. 3 but provides further insight at the elasticity of the burst and trickle mode.

In data flow 400, video content is provided to the UD in transfer cycles that are initiated by trigger events 1, 2, 3, etc. The first trigger event may be a notification (e.g., operating point message) from the video optimization engine 140 that the request from the UD is related to video content. The first batch of data is sent in burst mode, which may be at a data rate that is the maximum data rate available in that region at that time of the data transfer and what is allocated for the account of the UD. Put differently, in the example of FIG. 4, an adaptive data rate (ABR) is used during the burst mode, such that a maximum available data rate is used to transfer a predetermined volume of data (e.g., 12 MB). Thus burst mode lasts for the length of time 403 that it takes to transfer a predetermined volume of data (e.g., 12 Mb) to the UD.

The ABR discussed herein may be based on Hypertext Transfer Protocol (HTTP). The UD's bandwidth and CPU capacity is determined in real time by the packet core network 120 to adjust the maximum data rate during the burst mode. Accordingly, the higher the data rate during the burst mode, the shorter the time of the first burst mode.

Upon completion of the first burst mode 402, the second batch of data 404 is transferred in trickle mode at a predetermined second data rate, which is slower than the first data rate (of the burst mode). The trickle mode continues until the second trigger event occurs, indicating that the data in the buffer of the UD is below a predetermined threshold.

The trickle mode 404 continues until the second trigger event occurs, indicating that the buffer of the UD is below a predetermined threshold. The second trigger event initiates a second data transfer cycle. However, the UD may not have the same bandwidth and/or CPU capacity as during the first burst mode. For example, the UD may be moved into a region that has more bandwidth capacity or the CPU may now have a smaller processing load. In this regard, the data rate of the second burst mode 406 may increase. Since the data rate has increased, the duration 407 of the second burst mode is shorter than that of the first burst mode to transfer the predetermined volume of data (e.g., 12 Mb) to the UD.

When the buffer of the UD goes below a predetermined threshold, a message is sent to the P-GW 112 of the packet core network 120 to request additional data to provide an uninterrupted viewing experience to the operator of the UD. This message represents the third trigger event, which initiates a third data transfer cycle, which is similar to the first and second data transfer cycles in that it begins with a burst mode 410 and is followed by a trickle mode 412. However, the UD may now be in a region that has less bandwidth capacity or the CPU may now have a larger processing load. In this regard, the data rate of the third burst mode 410 may decrease. Since the data rate has decreased, the duration 411 of the third burst mode is longer than that of the first and second burst modes to transfer the predetermined volume of data (e.g., 12 Mb) to the UD. Accordingly, an adaptive data rate may be used during the burst mode, whereas the trickle mode is kept at a constant data rate.

Example Call Flow Process

Figure 5:
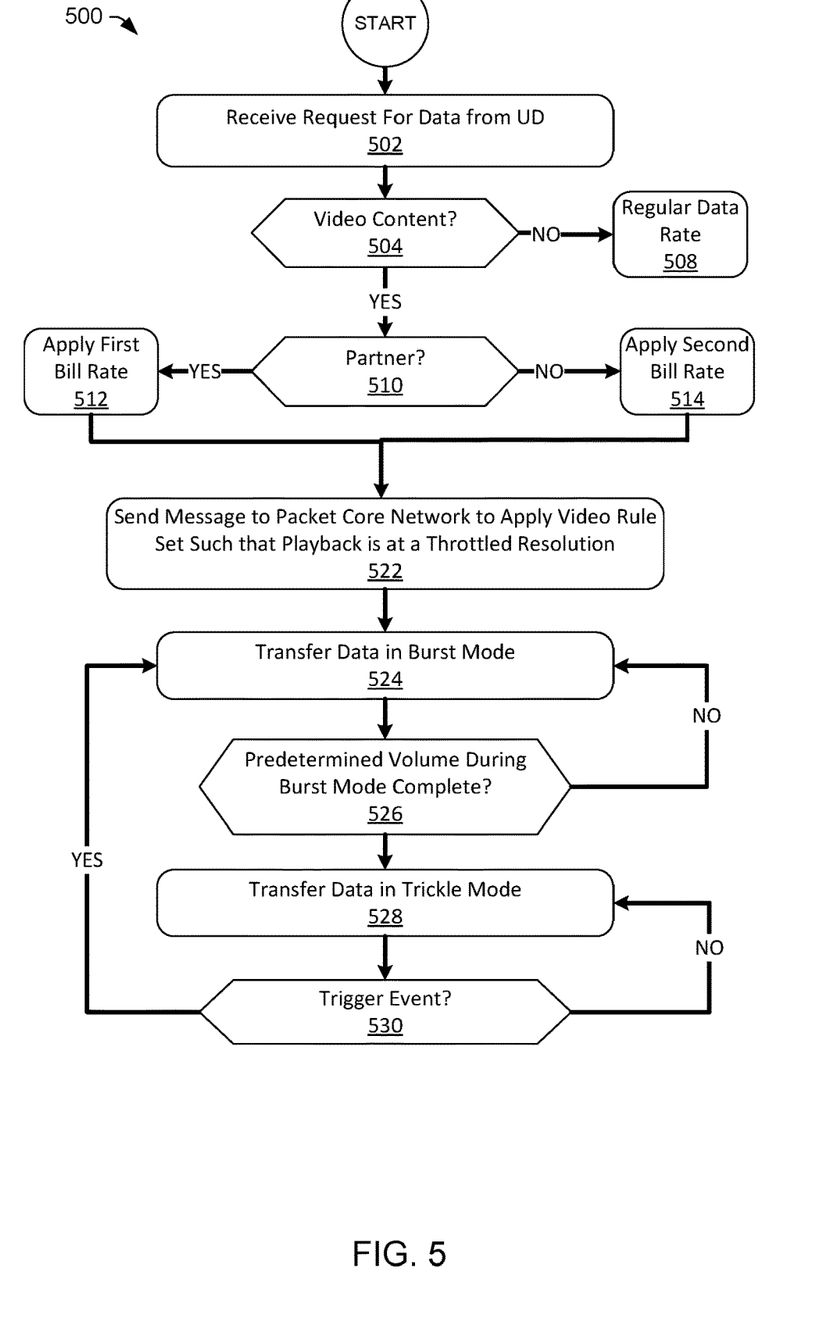
FIG. 5 presents an illustrative process for video flow optimization.

With the foregoing overview of the mobile communication network 100, the various components of the UD 200, and the data flow 300 and 400, it may be helpful now to consider a high-level discussion of an example call flow process. To that end, FIG. 5 presents an illustrative process 500 for video flow optimization. The process 500 is illustrated as a logical flow, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the architecture of the mobile communication network 100 of FIG. 1 and the UD of FIG. 2.

At block 502, the UD sends a request for data to a content provider, such as partner content provider 150 or non-partner content provider 160 over the packet core network 120. The request is received by the video optimization engine 140 of the Application Delivery Controller 130. In various embodiments, the request may be in Hypertext Transfer Protocol (HTTP), secure HTTP (HTTPS), User Datagram Protocol (UDP), etc.

At block 504, the video optimization engine 140 determines whether the request for data from the UD relates to video content. This determination can be performed from the traffic signature of the request. For example, the header fields in the transfer protocol, such as HTTP and HTTPS, define the operating parameters of an HTTP transaction. Typically, the headers include the Uniform Resource Locator (URL) of the content provider (e.g., Hulu, Netflix, etc.) Thus, in one embodiment, whether a request is related to video traffic can be determined by the content-type field in the header. For example, the content type, sometimes referred to as media type (MIME), is a two-part identifier for file formats and format contents transmitted in the Internet 128 in HTTP communication. Thus, in one embodiment, the content type field of the header could be used to determine whether a request is related to video traffic.

In some instances, the headers and corresponding traffic are encrypted (e.g., via HTTPS). Thus, the URL may not be able to be readily discerned. In this regard, in one embodiment, the Server Name Indication (SNI) may be used instead of the URL to determine the source of the content and, by implication, whether the content is related to video. The SNI is an extension to the Transport Layer Security (TLS) computer networking protocol by which a UD can indicate the hostname it is requesting data from, at the beginning of the handshaking process. For example, if a hostname relates to a content provider, then the traffic therefrom is deemed to relate to video.

HTTP and HTTPS communication are delivered over Transmission Control Protocol (TCP). However, in one embodiment, data may be transported via User Datagram Protocol (UDP). Both TCP and UDP are transport layer protocols of the Internet protocol suite. UDP is different in that there is no URL (as in a traditional header). Instead, the source port and the destination port are provided. The destination port for the request (e.g., partner content provider 150) and/or the source port of the content in the UDP header indicates the type of communication and whether the content is from a partner or non-partner content provider, discussed in more detail later.

Upon determining that the request for data is not related to video content (i.e., "NO" at decision block 504), the process continues with block 508, where the data is transmitted at a regular data rate. Put differently, the throttling techniques including the cycles of burst and trickle mode discussed herein are not applied.

However, upon determining that the request for data is related to video content (i.e., "YES" at decision block 504), in one embodiment, the process continues with block 510, where a determination is made whether the content is from a partner or non-partner content provider. Similar to the determination of whether the request is related to video content of block 504, the determination of whether the content is from a partner content provider can be identified from the traffic signature of the request. In one embodiment, the name of the content provider is compared to a lookup table 142 of the Application Delivery Controller 130.

In various embodiments, partner content providers may affect the account of the UD differently from non-partner content providers. For example, upon determining that the video content is from a partner content provider 150 (i.e., "YES" at decision block 510), the process continues with block 512, where a first bill rate is applied. On the other hand, upon determining that the video content is from a non-partner content provider 160 (i.e., "NO" at decision block 510), the process continues with block 514, where a second bill rate is applied. In one embodiment, the first bill rate does charge and/or deduct against the account of the UD (e.g., the periodic (e.g., monthly) allotment of data associated with an account of the UD). However, the second bill rate may charge and/or deduct from the periodic allotment of data associated with an account of the UD. For example, content that is streamed from a partner content provider is streamed for free while content from a non-partner content provider is charged for against an account of the UD.

At block 522, an operating mode message is sent to the packet core network 120 such that a video rule set is applied to subsequent data transfer, such that the playback on the UD is at an adjusted resolution, as described previously. In one embodiment, the message sent to the network 120 also includes whether the content is from a partner content provider 150, such that the account of the UD is billed accordingly. For example, the video optimization engine 140 sends the message to the P-GW 112 such that the data flow related to the video content is throttled accordingly, such that the UD displays the video content at a reduced resolution, such as SD.

At block 524, the message from the video optimization engine 140 (at block 522) acts as a trigger event indicating that the data communicated between the requestor UD and the content provider is related to video. Consequently, the first batch of data is sent in burst mode, which is at a high data rate. For example, the data rate during burst mode may be the maximum data rate available in that region at that time of the data transfer and what is allocated for the account of the UD.

The burst mode lasts for the length of time that it takes to transfer a predetermined volume of data (e.g., 12 Mb). To that end, at block 526, the P-GW 112 determines whether the predetermined volume of data has been transferred to the requestor UD. If the predetermined volume of data has not been transferred in burst mode to the buffer of the requestor UD (i.e., "NO" at decision block 526), the P-GW continues transferring data in burst mode.

However, upon completion of the burst mode ("YES" at decision block 526), the process continues with block 528 to enter a trickle mode, where the second batch of data is transferred at a second data rate (i.e., trickle mode), which is slower than the first data rate. For example, the trickle mode may be at a fixed or at a maximum 1.5 Mb/s.

The trickle mode continues until the next trigger event occurs (i.e., block 530), indicating that the buffer of the UD is below a predetermined threshold. Thus, upon determining that there is no trigger event (i.e., "NO" at decision block 528), the P-GW continues transferring data in trickle mode. However, if a trigger event occurs (i.e., "YES" at block 530), the process returns to block 524, where another burst mode is entered to replenish the buffer of the requestor UD such that the operator of the UD has an uninterrupted viewing experience. Thus, each trigger event initiates a new data transfer cycle, which is similar to the first data transfer cycle in that it has a burst mode that transfers the initial batch of data that is followed by a trickle mode that transfers the subsequent batch of data until another trigger event occurs.

Example Computer Platform

Figure 6:
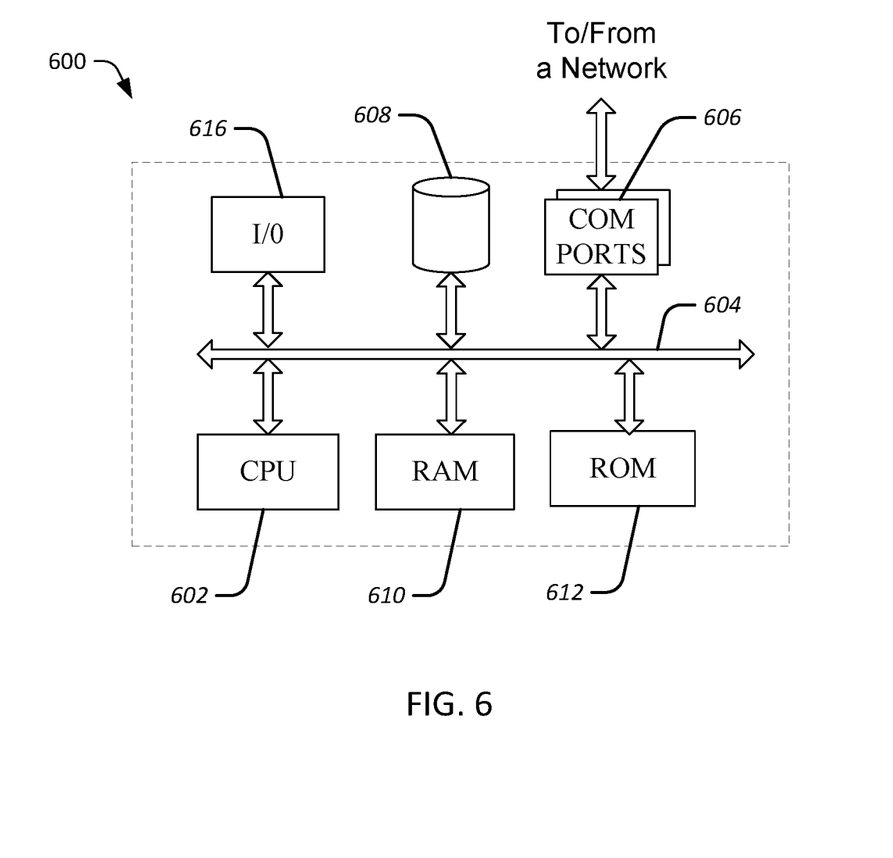
FIG. 6 provides a functional block diagram illustration of a computer hardware platform that may be used to implement the video optimization system.

As discussed above, functions relating to for optimizing the transmission of video content over a wireless network can be performed on one or more computing devices connected for data communication via wireless or wired communication, as shown in FIG. 1 and in accordance with the example process 500 of FIG. 5. An exemplary computing device in the form of a user device 102 has been discussed above with respect to FIG. 2. FIG. 6 provides a functional block diagram illustration of a computer hardware platform. In particular, FIG. 6 illustrates a network or host computer platform 600, as may be used to implement a server, such as the Application Delivery Controller 130, CRM 132, partner content provider 150, non-content partner provider 160, and various components of the packet core network 120.

A computer configured as a server, for example, includes a data communication interface 606 for packet data communication. The server computer may include an I/O interface 616 that may include a display, a touch screen, a keyboard, a pointing device, a microphone, a loudspeaker, and/or any other type of user interface device. The server computer also includes a central processing unit (CPU) 602, in the form of one or more processors, for executing program instructions. The server platform may include an internal communication bus 604, program storage 608, and data storage for various data files to be processed and/or communicated by the server, although the server receive programming and data via network communications. Data can be stored in various forms of computer-readable media, including (but not limited to) hard disk 608, random access memory (RAM) 610, read only memory (ROM) 612, and the like.

The hardware elements, operating systems and programming languages of such servers are conventional in nature. Of course, the server functions may be implemented in a distributed fashion on a number of similar platforms, to distribute the processing load. In one embodiment, the functionality of the servers discussed herein may be combined in one or more server platforms. For example, the functions of the CRM 132 and the Application Delivery Controller 130 may be performed on the same server (e.g., Application Delivery Controller 130). In one embodiment, the platform 600 may have a scalable and fault-tolerant architecture, such as that provided by the cloud.

The software functionalities discussed herein involve programming, including executable code as well as associated stored data, e.g., files used for applications on the Application Delivery Controller 130, such as the video optimization engine 140 and the lookup table 142, as discussed herein.

The software code is executable by the corresponding computing device. In operation, the code is stored within the computing device. At other times, however, the software may be stored at other locations and/or transported for loading into the appropriate computing device system. Execution of such code by a processor of the computing device enables the computing device to perform the optimization of the transmission of video content over a packet core network functions described herein. Hence, aspects of the methods of optimizing the transmission of video content as outlined above may be embodied in programming. Program aspects of the technology may be thought of as "products" or "articles of manufacture" typically in the form of executable code and/or associated data that is carried on or embodied in a type of non-transitory machine readable medium.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that the determination of whether the request for data is related to video content is performed upon subscriber approval.

It is understood that any specific order or hierarchy of steps in the process disclosed in FIG. 5 are illustrations of exemplary approaches. Based upon design preferences, it is understood that the specific order or hierarchy of steps in the processes may be rearranged, expanded, and some steps omitted. Some of the blocks may be performed simultaneously. For example, whether the data is from a partner content provider (i.e., block 510) may be skipped altogether. In another example, two or more blocks can be performed simultaneously, such those actions related to blocks 504, 510, and/or 516.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device configured to optimize video content, the computing device comprising:
    a processor;
    a network interface communicatively coupled to the processor configured to enable communications with a packet core network;
    a storage device;
    a video optimization application stored in the storage device, wherein execution of the video optimization application by the processor configures the computing device to perform acts comprising:
    receiving a request for data, wherein the request for data is received from a user device (UD);
    upon determining that the request for data is related to video content, sending an operating mode message to an element of the packet core network to configure the element of the packet core network to transmit the video content in data transfer cycles, wherein each data transfer cycle comprises:
        (i) transmitting, to the UD, a predetermined volume of data of the video content in a burst mode, wherein transmitting the predetermined volume of data to the UD in the burst mode comprises transmitting the predetermined volume of data at a first data rate for a duration that is dependent on the first data rate; and
        (ii) upon completion of the burst mode, transmitting, to the UD, a continuation of a data related to the video content at a trickle mode, wherein transmitting the continuation of the data to the UD in the trickle mode comprises transmitting the continuation of the data at a second data rate until a trigger event is received at the computing device, and wherein the second data rate is slower than the first data rate;
    upon receiving the trigger event, initiating another data transfer cycle that includes transmitting the predetermined volume of data to the UD in the burst mode followed by transmitting the continuation of the data in the trickle mode until another trigger event is received at the computing device, wherein receiving the trigger event comprises receiving a message from the UD indicating that a memory buffer of the UD is below a predetermined threshold.

2. The computing device of claim 1, wherein execution of the video optimization application further configures the computing device to perform acts comprising: upon determining that the request for data is related to video content and the request for data is to a partner content provider, not charging against an account of the UD for the transmitted video content.

3. The computing device of claim 2, wherein execution of the video optimization application further configures the computing device to perform acts comprising: upon determining that the request for data is related to video content and the request for data is to a non-partner content provider, charging against an account of the UD for the transmitted video content.

4. The computing device of claim 2, wherein the determination that the request for data is to a partner content provider comprises:
    extracting a Uniform Resource Locator (URL) from a header information to determine a content provider; and
    comparing the content provider to a lookup table in a memory of an Application Delivery Controller storing names of partner content providers.

5. The computing device of claim 1, wherein:
    the element of the packet core network is a gateway server of the packet core network; and
    the trigger event comprises receiving, by the gateway server, a notification from the UD that the memory buffer of the UD is below the predetermined threshold.

6. The computing device of claim 1, wherein the volume of data that is transferred to the UD in burst mode is based on limiting the UD from entering a play mode for the video content that is above that of a predetermined resolution.

7. The computing device of claim 6, wherein the predetermined resolution is standard definition (SD) mode.

8. The computing device of claim 1, wherein the determination that the request for data is related to video content is based on a traffic signature in an HTTP or HTTPS header of the request for data.

9. The computing device of claim 1, wherein the determination that the request for data is related to video content comprises extracting a content type from a content-type field in a header of the request for data.

10. The computing device of claim 1, wherein the determination that the request for data is related to video content is based on a server name indication (SNI) in the header of the request for data.

11. The computing device of claim 1, wherein:
the request for data is in a User Datagram Protocol (UDP); and
the determination that the request for data is related to video content and directed to a partner content provider is based on a traffic signature in a UDP header of the request for data.

12. The computing device of claim 1, wherein the burst mode is based on a fastest data rate the packet core network can accommodate.

13. The computing device of claim 1, wherein the burst mode is based on a maximum adaptive bit rate (ABR) such that a maximum available data rate is used to transfer the predetermined volume of data of the video content in burst mode.

14. A non-transitory computer-readable medium having stored thereon a plurality of sequences of instructions which, when executed by a processor of a host computer platform, cause the processor to perform acts comprising:
receiving a request for data, wherein the request for data is received from a user device (UD); and
upon determining that the request for data is related to video content, sending an operating mode message to a gateway server of the packet core network to configure the gateway server to transmit the video content in data transfer cycles, wherein each data transfer cycle comprises:
(i) transmitting, to the UD, a predetermined volume of data of the video content in a burst mode, wherein transmitting the predetermined volume of data to the UD in the burst mode comprises transmitting the predetermined volume of data at a first data rate for a duration that is dependent on the first data rate; and
(ii) upon completion of the burst mode, transmitting, to the UD, a continuation of a data related to the video content at a trickle mode, wherein transmitting the continuation of the data to the UD in the trickle mode comprises transmitting the continuation of the data at a second data rate until a trigger event is received at the host computer platform, and wherein the second data rate is slower than the first data rate;
upon receiving the trigger event, initiating another data transfer cycle that includes transmitting the predetermined volume of data to the UD in the burst mode followed by transmitting the continuation of the data in the trickle mode until another trigger event is received at the host computer platform, wherein receiving the trigger event comprises receiving a message from the UD indicating that a memory buffer of the UD is below a predetermined threshold.

15. The non-transitory computer-readable medium of claim 14, wherein the acts further comprise:
upon determining that the request for data is related to video content and the request for data is to a partner content provider, not charging against an account of the UD for the transmitted video content; and
upon determining that the request for data is related to video content and the request for data is to a non-partner content provider, charging against an account of the UD for the transmitted video content.

16. The non-transitory computer-readable medium of claim 15, wherein the determination that the request for data is to a partner content provider comprises:
extracting a Uniform Resource Locator (URL) from a header information to determine a content provider; and
comparing the content provider to a lookup table.

17. The non-transitory computer-readable medium of claim 14, wherein the determination that the request for data is related to video content comprises extracting a content type from a content-type field in a header of the request for data.

* * * * *